C. A. A. RAND.
TONGUE TRUCK.
APPLICATION FILED NOV. 4, 1914.
1,242,980.
Patented Oct. 16, 1917.
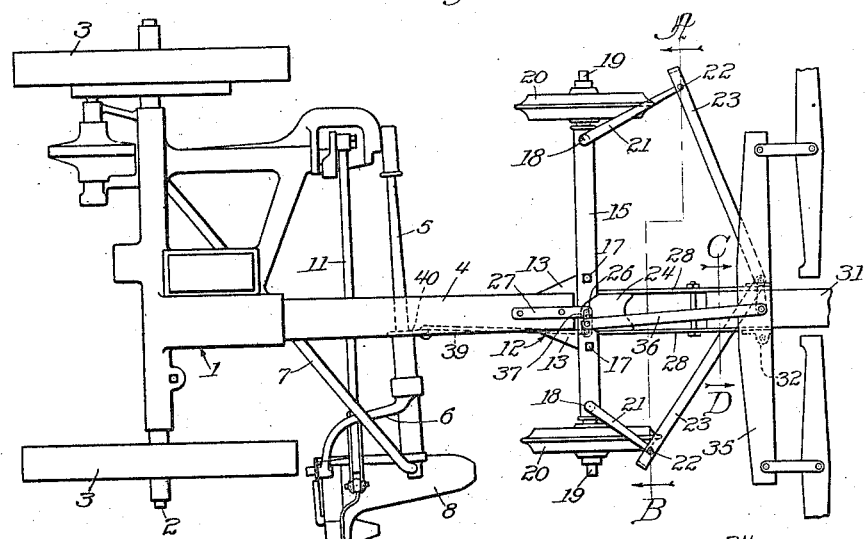
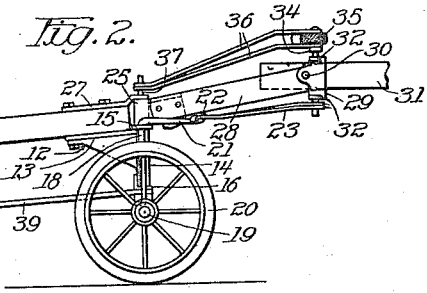
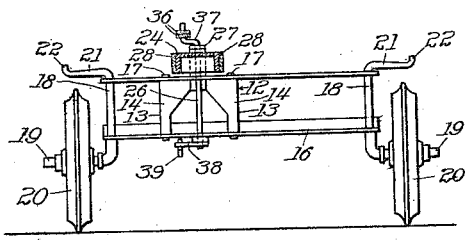
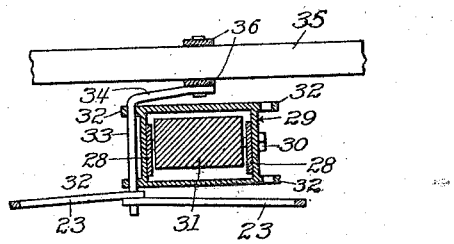
Witnesses:
J. N. Dagg
E. W. Burgess
Inventor.
Charles A. A. Rand.
by Chas. E. Lord
Atty.

UNITED STATES PATENT OFFICE.

CHARLES ALFRED ANDERSON RAND, OF NEUSS, GERMANY, ASSIGNOR TO INTERNATIONAL HARVESTER COMPANY OF NEW JERSEY, A CORPORATION OF NEW JERSEY.

TONGUE-TRUCK.

1,242,980.      Specification of Letters Patent.      Patented Oct. 16, 1917.

Application filed November 4, 1914. Serial No. 870,216.

*To all whom it may concern:*

Be it known that I, CHARLES A. A. RAND, a citizen of the United States, residing at Neuss, Rhineland, Germany, have invented certain new and useful Improvements in Tongue-Trucks, of which the following is a full, clear, and exact specification.

My invention relates to tongue trucks, and especially to those used in connection with mowers, harvesters, tillage implements or the like, and having a stub tongue as a part of the equipment.

The object of my invention is to provide a construction of truck whereby the draft connections between the truck and the device connected thereto are directed in a manner to eliminate any tendency of the draft power to cause the operative parts of the trailing device, as the cutting apparatus of a mowing machine, to rise from the ground during the operation of the machine.

I attain this object by means of mechanism, one embodiment of which is illustrated in the accompanying drawing, in which—

Figure 1 is a top plan view of a tongue truck embodying my invention and operatively connected with the stub tongue of a mowing machine;

Fig. 2 is a side elevation of part of Fig. 1;

Fig. 3 is a front elevation of the truck along line A—B as shown in Fig. 1;

Fig. 4 is a cross section of part of the draft mechanism as seen along line C—D of Fig. 1.

Referring to the drawings, wherein the same reference numerals designate like parts throughout the several views, 1 represents the main frame of a mowing machine; 2 the main driving shaft having carrying wheels 3 upon its opposite ends; 4 a stub tongue member having its rear ends secured to the main frame; 5 a coupling bar having its stubbleward end pivotally connected with the main frame in a manner permitting its opposite end to rise and fall in a vertical plane in a common way; 6 a coupling yoke carried by the grassward end of the coupling bar and adapted to rock about its axis; 7 a diagonally disposed push bar having one end connected with the grassward end of the coupling bar beyond the yoke 6 and its opposite end pivotally connected with the main frame in rear of the pivotal connection therewith of the coupling bar 5; 8 an inner shoe pivotally connected with the yoke 6, the axial line of its pivotal connection being in the direction of the line of draft of the machine; 9 a finger bar secured to the shoe; 10 a sickle carried by the finger bar; and 11 a pitman connecting the sickle with the power transmission mechanism of the machine. Secured to the lower side of the front end of the stub tongue 4 is a bracket member 12 having forwardly diverging arms 13 provided with vertically disposed sleeve members 14 at their front ends, and 15 and 16 represent the upper and lower relatively fixed truck axle members respectively that are secured to the sleeves 14 by means of bolts 17. The axle members are provided with vertically disposed openings at their opposite ends that form bearings for rocking wheel supporting shafts 18 having integral therewith laterally turned arms 19 at their lower ends upon which are journaled truck wheels 20, and 21 represents forwardly diverging crank arms at the upper ends of the shafts having vertically disposed portions 22 at their free ends to which are pivotally connected the rear ends of wheel controlling bars 23. 24 represents a bracket member having a vertically disposed sleeve 25 at its rear end whereby it is pivotally connected with the axle members by means of a shaft 26 supported at its upper end by means of a strap 27 secured to the stub tongue 4 of the machine. 28 represents forwardly extending truck tongue members disposed in parallel relation, having their rear ends secured to opposite sides of the bracket member 24 and their front ends pivotally connected with opposite sides of a box member 29 by means of a transverse bolt 30 received by a transverse opening in the rear end of a draft tongue 31. The opposite sides of the box member 29 are provided with laterally extending ear members 32 spaced apart vertically and having openings therein that receive a rocking draft member 33 provided with a laterally extending crank arm 34 at its upper end and having the front ends of the wheel controlling bars 23 pivotally connected with its lower end. 35 represents a draft evener carried by the crank arm 34, and 36 draft members having their front ends connected with the crank arm 34 coaxially with the evener and upon its opposite sides, the arrangement of the draft connections being such as to permit a transposition of the evener and draft members 33 to the opposite side of the box member 29, thereby shifting the line of draft laterally. The shaft 26 is provided at its upper end with a laterally extending crank arm 37 with which the rear ends of the draft members 36 are pivotally connected, and at its lower end with a crank arm 38 that is connected with the coupling bar 5 of the mower by means of a draft bar 39 and link 40 adapted to turn about the axis of the coupling bar.

The construction of the truck is substantially the same as that shown in an earlier patent to me issued June 13, 1911, and having No. 994,787. Its function of guiding and supporting the stub tongue is practically the same, the essential elements of the improvement being the draft connections between the evener and the machine whereby the draft force is transmitted directly from the evener to the coupling bar in a line substantially parallel with the surface of the ground and in the same horizontal plane as the point of connection with the coupling bar, thereby eliminating any tendency of the draft power to raise the coupling frame from the ground and transferring the draft from the stub tongue of the machine, as in my patent noted above, directly to its coupling frame.

While I have shown and described one form of my invention, I do not wish that it be confined to the specific detail of construction as shown, it being understood that the form shown is used for purposes of illustration, and that modifications may be made in it without departing from the spirit of my invention.

What I claim is:

1. In combination, a device to be drawn, a tongue truck therefor, a tongue carried by said truck, an evener on the tongue of said truck and movable transversely and longitudinally with respect thereto, and means between said evener and said device for maintaining the draft in a plane substantially parallel to the ground.

2. In combination, a device to be drawn, a tongue truck, a tongue carried by said truck, a draft member movable transversely and longitudinally with respect thereto, and means directly connected to said draft member and supported by said truck for transmitting power applied to said draft member to said device to be drawn, said power transmitting means delivering the power in a plane substantially parallel with the ground and located below the plane of said draft member.

3. In a draft connection for tongue trucks, a truck frame, a vertically disposed shaft journaled therein having cranks on its opposite ends, and draft connections operatively connected to said cranks.

4. In a draft connection for tongue trucks, a tongue truck, a vertically disposed shaft journaled therein having cranks on its opposite ends, an evener on said truck and oppositely disposed draft connections connected to said cranks, one of the same being connected to said evener.

5. In combination, a trailing device having a stub tongue and operative elements located in a plane close to the surface of the ground, a tongue truck operatively connected to said stub tongue, an evener on said truck movable transversely and longitudinally with respect thereto, and means connected between said evener and said operative elements for maintaining the draft in a plane substantially parallel with the ground, said means being independent of said stub tongue.

6. In combination, a trailing device having operative elements located in a plane close to the surface of the ground, a tongue truck operatively connected to said trailing device and having swiveled wheels, an evener on said tongue truck movable transversely and longitudinally with respect thereto, steering connections between said wheels and said tongue truck, and means connecting said evener and said operative elements maintaining the draft in a plane substantially parallel to the ground.

7. In a draft connection for tongue trucks, a tongue truck, a tongue operatively connected thereto, a vertically extending shaft protruding through said truck and tongue, cranks formed on the upper and lower ends of said shaft, and longitudinally extending oppositely disposed draft links pivotally connected to said cranks.

8. In a draft connection for tongue trucks, a tongue truck, an evener operatively connected to the tongue of said truck, a vertically disposed pivot member journaled in said tongue and truck, cranks on the opposite ends of said member, a forwardly extending draft connection connecting one of said cranks to said evener, and a rearwardly disposed draft connection pivotally connected to the remaining crank.

9. In a draft connection for tongue trucks, a truck, a tongue protruding therefrom, an evener carried on said tongue, a plurality of pairs of draft links pivotally connecting said truck and evener, and means including a supplemental draft connection operatively connectible between said truck and evener and a device to be drawn for maintaining the draft on the latter in a plane substantially parallel with the surface of the ground.

10. In a draft connection for tongue trucks, a tongue truck comprising a truck frame, wheels swiveled thereon and a forwardly protruding tongue, a crank journaled on said tongue, an evener journaled on said crank, wheel deflecting connections between one end of said crank and said wheels, a crank journaled on said truck frame, and a draft connection between one end of said crank and said first mentioned crank.

11. In combination, a device to be drawn having a stub tongue, a tongue truck swivelingly mounted thereon and movable laterally thereto and to the line of draft, a tongue pivoted on said truck and movable in a vertical plane, an evener carried on said tongue and movable transversely and longitudinally with respect to said tongue, and draft connections between said evener and said device to be drawn for maintaining the draft in a plane substantially parallel to the ground, said connections being independent of said stub tongue.

12. A tongue truck for a trailing device including, in combination, a stub tongue, a truck tongue member pivotally connected with said stub tongue, a draft evener carried by said truck tongue member and movable bodily relative thereto in the direction of the line of draft, a vertically disposed rock shaft carried by said stub tongue and having laterally extending crank arms at its opposite ends, and draft connections between said evener and the crank arm at the upper end of said shaft and between the remaining arm and the trailing device.

13. A tongue truck for a device to be drawn having operative elements located in a plane close to the surface of the ground including, in combination, a stub tongue, a truck tongue member, a vertically disposed shaft forming a pivotal connection between adjacent ends of said tongues and having laterally extending crank arms at its opposite ends, a draft evener carried by said truck tongue member and movable bodily relative thereto in the direction of the line of draft, draft bars connecting said evener with the crank arm at the upper end of said shaft, and draft connections between said operative elements on said device and the arm at the lower end of said shaft.

14. A tongue truck for a device to be drawn having operative elements located in a plane close to the surface of the ground including, in combination, a stub tongue, a truck tongue member, a vertically disposed shaft forming a pivotal connection between adjacent ends of said tongues and having laterally extending crank arms at its opposite ends, a horizontally swinging link carried by said truck tongue member, a draft evener pivoted upon the free end of said link, draft connections between said evener and the crank arm at the upper end of said shaft, and draft connections between said operative elements on said device and said remaining crank arm.

15. In a draft connection for tongue trucks, a truck frame, wheels swivelingly mounted thereon having forwardly protruding arms, a tongue carried on said truck frame, a shaft journaled on said tongue having a crank at one end thereof, an evener journaled on said crank, wheel deflecting connections between the opposite end of said shaft and the arms on the wheels, a second shaft journaled on said truck frame having cranks on its opposite ends, a draft connection between one of said cranks and the crank on said first mentioned shaft, a device to be drawn having a stub tongue operatively connected to said truck frame, and a draft connection between said device and the other crank on said second shaft.

16. A tongue truck for a device to be drawn having operative elements located in a plane close to the surface of the ground including, in combination, a stub tongue, a truck axle secured to the front end of said stub tongue, vertically disposed rock shafts carried by opposite ends of said axle, laterally extending arms at the lower ends of said shafts, truck wheels journaled upon said arm, crank arms at the opposite ends of said shafts, a truck tongue member, a vertically disposed shaft forming a pivotal connection between adjacent ends of said tongues and having laterally extending crank arms at its opposite ends, a swinging draft link comprising a depending stem journaled upon said truck tongue member, a draft evener pivoted upon the free end of said link, wheel controlling bars connecting the lower end of the vertical part of said link with the crank arms upon said wheel supporting shafts, draft bars connecting the free ends of said link with the crank arm upon the upper end of the truck connecting shaft, and a draft bar connecting said operative elements on said device with the crank arm at the lower end of said shaft.

17. In combination, a device to be drawn including operative elements located in a plane close to the surface of the ground, a tongue truck, a draft member carried by said truck and movable transversely and longitudinally with respect thereto, and power transmission means connecting said draft member directly to said operative elements and delivering the power in a plane substantially parallel to the surface of the ground.

18. In combination, a trailing device having operative elements located in a plane close to the surface of the ground, and draft mechanism including a tongue truck and a draft member carried thereby and movable transversely and longitudinally with respect thereto for said device connected thereto only through said operative elements and maintaining the draft in a plane substantially parallel to the ground.

19. In combination, a trailing device having operative elements located in a plane close to the surface of the ground, draft mechanism including a tongue truck for said device connected thereto only through said operative elements and maintaining the draft in a plane substantially parallel to the ground, and means connecting said tongue truck and said device whereby said draft mechanism operates through the said operative elements to propel said tongue truck.

In testimony whereof I affix my signature, in the presence of two witnesses.

CHARLES ALFRED ANDERSON RAND. [L. S.]

Witnesses:
ALBERT KEEFER,
GEORGE G. ALVARD.

Copies of this patent may be obtained for five cents each, by addressing the "Commissioner of Patents, Washington, D. C."